3,093,492
METAL PROTECTIVE COATING COMPOSITION
Norman B. Larsen, Norristown, Pa., assignor to Corrosion Reaction Consultants Inc., Philadelphia, Pa., a corporation of Pennsylvania
No Drawing. Filed May 27, 1960, Ser. No. 32,486
13 Claims. (Cl. 106—14)

The present invention is directed to a metal protective coating composition, and more particularly to a coating which may be applied to the surface of a metal, and which will protect the metal against corrosion, rust formation, and other adverse affects for extended periods of time.

This application is a continuation-in-part of my co-pending patent application entitled Metal Protective Coating Composition, Serial No. 26,966, filed May 5, 1960.

The coating composition of my earlier application is exceedingly durable, and has a strong affinity for metal surfaces and resists extended exposure under severe conditions.

However, in application where an extremely thin film of the protective coating composition is necessary, such as the type of film derived from the utilization of aerosols, and yet where extreme resistance to salt water attack is needed (such as resistance to 300 hours and more exposure to the conventional A.S.T.M. salt bath test), a modified material is deemed necessary.

This invention has as an object the provision of a novel metal coating composition.

This invention has as another object the provision of a novel protective coating composition which may be applied to metal surfaces of aerosolization in extremely thin coatings, and yet will confer corrosion resisting characteristics when so-applied.

Other objects will appear hereinafter.

The coating compositions of the present invention comprise a modified polymer from that of my earlier application, namely a polymer formed from the reaction between a sorbitan mono fatty acid ester and an ester of stearic acid and an alcohol having from one to six carbon atoms, and benzoic acid or a substituted derivative of benzoic acid, which has been polymerized in the presence of substantially pure zinc, and which contains a polar organic compound corrosion inhibitor.

For application to a metal surface, as by aerosolization, the aforesaid protective coating composition should be dissolved in a solvent, with the preferred solvents comprising chlorinated solvents.

The weight ratio between the sorbitan mono fatty acid ester, the ester of stearic acid and an alcohol having from one to six carbon atoms, and the benzoic acid or a substituted derivative of benzoic aid is not critical, and may be varied over a wide range. For example, from one to six parts by weight of the sorbitan mono fatty acid ester may be utilized per part by weight of the ester of stearic acid and the alcohol having from one to six carbon atoms, and per part by weight of the benzoic acid or a substituted derivative of benzoic acid.

A wide variety of sorbitan mono fatty acid esters may be utilized, examples including sorbitan monolaurate; sorbitan monopalmitate; sorbitan monostearate; sorbitan monooleate; etc. Such materials may range from oily liquids through waxy solids.

The esters of stearic acid and an alcohol having from one to six carbon atoms include methyl stearate, ethyl stearate, propyl stearate, isopropyl stearate, butyl stearate, isobutyl stearate, amyl stearate, isoamyl stearate, hexyl stearate, etc.

By substituted derivative of benzoic acid is used herein is meant a derivative of benzoic acid in which one or more of the hydrogen atoms on the benzene ring has been replaced with another atom or a radical. By way of example suitable substituted derivatives of benzoic acid which may be utilized in the present invention include 3-amino-2-nitro benzoic acid; 3-amino-4-nitro benzoic acid; o-benzyl-benzoic acid; p-benzyl-benzoic acid; o-bromo-benzoic acid; m-bromo-benzoic acid; p-bromo-benzoic acid; o-chloro-benzoic acid; m-chloro-benzoic acid; p-chloro-benzoic acid; 2,3-diamino benzoic acid; 2,4-diamino benzoic acid; 2,5-diamino benzoic acid; 3,4-diamino benzoic acid; 3,5-diaminobenzoic acid; 2,3-dibromo benzoic acid; 2,4-dibromo benzoic acid; 2,5-dibromo benzoic acid; 2,6-dibromo benzoic acid; 3,4-dibromo benzoic acid; 2,3-dichloro benzoic acid; 2,4-dichloro benzoic acid; 2,5-dichloro benzoic acid; 2,6-dichloro benzoic acid; gentisic acid; veratric acid; 2,4-dinitro benzoic acid; o-ethoxy benzoic acid; p-ethoxy benzoic acid; o-ethyl benzoic acid; o-fluoro benzoic acid; p-fluoro benzoic acid; o-iodo benzoic acid; o-toluic benzoic acid; o-phenyl benzoic acid; m-phenyl benzoic acid; p-phenyl benzoic acid; etc.

A wide variety of polar organic compound corrosion inhibitors are now commercially available. Such corrosion inhibitors are soluble in organic bases and yet protect metals against corrosion and rust formation. Examples of polar organic corrosion compound inhibitors include the complex organic phosphate materials sold by Monsanto Chemical Company of St. Louis 24, Missouri, under the trademark "Santolene C." Other polar organic compound corrosion inhibitors include a wide variety of amine oxides, such as trimethylamine oxide; triethylamine oxide; tripropylamine oxide; methyldiethylamine oxide; ethyldimethylamine oxide; etc.

The concentration of the polar organic compound corrosion inhibitor in the compositions of the present invention is determined by the relative efficacy of the particular inhibitor.

The compositions of the present invention are prepared by refluxing the sorbitan mono fatty acid ester, the ester of stearic acid and an alcohol having from one to six carbon atoms, the benzoic acid or a substituted derivative of benzoic acid, plus the polar organic compound corrosion inhibitor in a solvent in the presence of substantially pure zinc. A variety of solvents may be used for refluxing. These include mineral spirits, mineral oil, mixtures of mineral oil and chlorinated solvents such as trichlorethylene, etc. The solvents may include blown oils, which remain in the finished metal protective coating composition. Examples of such blown oils include castor oil, linseed oil, rape oil, whale oil and fish oils.

After refluxing, the solvents should be boiled off, and the metal protective coating composition separated out. The metal protective coating composition is then dissolved in a chlorinated solvent such as chloroform, carbon tetrachloride, ethylene chloride, ethylidene chloride, etc.

It is absolutely essential for the purposes of the present invention that the polymerization between the sorbitan mono fatty acid ester, an ester of stearic acid and an alcohol having from one to six carbon atoms, and the benzoic acid or a substituted derivative of benzoic acid be effected in the presence of substantially pure zinc. A wide variety of other catalytic materials have been tested including alloys of zinc and copper, pure copper, lead, mixtures of zinc and lead, and without exception, the polymerization could not be effected unless the zinc catalyst was in the pure state.

In the following examples, the order of addition of the components is generally not critical.

Example I 141 parts by weight of trichlorethylene, 210 parts by weight of mineral spirits, 86 parts by weight of petroleum oil, 15 parts by weight of sorbitan monostearate, 5 parts by weight of a commercial polar organic compound corrosion inhibitor designated "Santolene C," 5 parts by weight of butyl stearate, and 5 parts by weight of phenyl benzoate are heated together in the presence of pure zinc metal at 360° F. for ten minutes. As a result of the reaction between the components the color of the mixture changed to a deep gold.

The volatile solvents were then distilled off. 20 parts by weight of petroleum naphtha was then added to the mixture followed by the addition of ten parts by weight of boiled linseed oil, and the mixture was solubilized by heating to reflux temperature, and maintaining it at reflux temperature for about two hours. On cooling, the resin was removed from the mixture and purified by resolubilization and precipitation utilizing trichlorethylene as a solvent.

The resultant resin was hard, golden in color, with a very high gloss.

Upon dissolving the above resin in a solvent and aerosolizing the solution a thin film coating of the resin was obtained on armor plate. Pitting of the armor plate was not encountered after more than 300 hours of exposure to the standard A.S.T.M. salt bath test.

The aerosolized film, although so thin as to be almost non-detectable as a coating, possessed an unusually high tenacity and affinity for its metal substrate, and was retained on its metal substrate notwithstanding repeated agitation.

Example II

A mixture was prepared of 15 parts by weight of sorbitan monostearate, 8 parts by weight of a commercial polar organic compound corrosion inhibitor designated "Santolene C," 5 parts by weight of butyl stearate, and 5 parts by weight of benzoic acid. This mixture was diluted with 40 parts by weight of petroleum naphtha. The mixture was then heated in the presence of pure zinc at a temperature of 200° C. This temperature was maintained for 24 hours. After 18 hours 30 parts by weight of boiled linseed oil was added to the mixture.

The resin was separated from the vessel at the close of the 24 hour heating period and yielded a high gloss golden colored resin having excellent anti-corrosive and anti-rust characteristics when applied as an exceedingly thin film by aerosolization to a metal substrate.

*Example III*

The procedure of Example I was duplicated except that in place of the Santolene C there is substituted trimethylamine oxide hydrate to the extent of 10 parts by weight. The resultant composition likewise possessed superb anti-corrosion and anti-rust characteristics when applied as a thin film through aerosolization.

*Example IV*

The procedure of Example II was repeated except that the liner instead of being pure zinc was a mixture of 75 weight percent zinc and 25 weight percent lead. No polymerization was obtained.

*Example V*

The procedure of Example II was repeated except that in place of the liner of pure zinc, there was substituted a mixture of 50 weight percent zinc and 50 weight percent copper. No polymerization was obtained.

*Example VI*

The procedure of Example II was repeated except that in place of the zinc liner there was substituted a liner of pure copper. No polymerization was obtained.

*Example VII*

The procedure of Example II was repeated except that in place of the Santolene C there was substituted triisopropylamine oxide and in place of the butyl stearate there was substituted propyl stearate. The resultant polymer compared favorably as a metal protective coating composition with the coating composition derived from Example II.

*Example VIII*

The procedure of Example VII was duplicated except that in place of the propyl stearate there was substituted stearic acid. No appreciable polymerization was obtained.

*Example IX*

The procedure of Example I was duplicated except that in place of o-phenyl benzoate, there was substituted 8 parts by weight of 2,5-chloro benzoic acid. The resultant polymer compared favorably as a metal protective coating composition with the coating composition derived from Example I.

*Example X*

The procedure of Example I was duplicated except that in place of o-phenyl benzoate, there was substituted 10 parts by weight of 2,5-dinitro benzoic acid. The resultant polymer compared favorably as a metal protective coating composition with the coating composition derived from Example I.

*Example XI*

The procedure of Example I was duplicated except that in place of o-phenyl benzoate, there was substituted 8 parts by weight of 2,5,6-trimethyl benzoic acid. The resultant polymer compared favorably as a metal protective coating composition with the coating composition derived from Example I.

A wide variety of tests were conducted to determine if there was a critical ratio between the sorbitan mono fatty acid ester, the ester of stearic acid and an alcohol having from one to six carbon atoms, and the benzoic acid or a substituted derivative of benzoic acid. It was found that the relative proportions of these materials were not critical at least within the range of from one to six parts by weight of the sorbitan mono fatty acid ester to one part by weight of the ester of stearic acid and an alcohol having from one to six carbon atoms, and to one part by weight of the benzoic acid or a substituted derivative of benzoic acid.

It was also determined that as long as the temperature of reaction was maintained at least at 300° F. for an appreciable period of time, the polymerization could be effected. Generally, the temperature range within 350° F. to 400° F. for a refluxing time of 24 to 36 hours gave the best results.

The resistance to corrosion achieved by the compositions of the present invention is exceedingly high even when they are present as exceedingly fine films. Moreover, the tenacity of the compositions of the present invention, even when deposited as very fine films, is exceedingly high. By extrapolating from A.S.T.M. salt spray tests, it has been determined that exceedingly thin film coatings deposited from very fine sprays of aerosols should give protection of upwards of several years to a metal substrate. I do not wish to be bound by any theory of operation, but it is my belief that the protective coatings of the present invention effectively isolate the metal substrates to which they are applied. Any penetration of the coating is apparently effectively defeated by the polar organic compound corrosion inhibitor which is uniformly dispersed in the coating, and which is available at any point of penetration.

The polymers of the present invention may serve as a vehicle for any organic compound corrosion inhibitor which is compatible therewith, and the concentration of such organic compound corrosion inhibitor will vary depending upon its nature and the use to which the metal protective coating composition is to be put. However, as above-indicated, the polymer of the subject invention has maximum utility in connection with polar organic compound corrosion inhibitors.

The present invention may be embodied in other specific forms without departing from the spirit or essential attributes thereof and, accordingly, reference should be made to the appended claims, rather than to the foregoing specification as indicating the scope of the invention.

I claim:
1. A metal protective coating composition consisting essentially of a solvent containing a resin which is the reactive product of about one to six parts by weight of a sorbitan mono fatty acid ester per one part by weight of an ester of stearic acid and an alcohol having from one to six carbon atoms and per one part by weight of a compound selected from the group consisting of benzoic acid and substituted derivatives of benzoic acid in which at least one substitution of one of the hydrogen atoms on the benzene nucleus of the benzoic acid with the group selected from $NH_2$, $NO_2$, F, Cl, Br, I, and the following organic radicals: methoxy, ethyl, ethoxy, benzyl, toluic, and phenyl is made, and which contains intimately dispersed therewithin a compatible corrosion inhibitor.

2. A metal protective coating composition in accordance with claim 1 in which the corrosion inhibitor comprises a polar organic compound corrosion inhibitor.

3. A metal protective coating composition in accordance with claim 2 in which the corrosion inhibitor comprises a tertiary amine oxide.

4. A metal protective coating composition in accordance with claim 1 which includes a blown oil.

5. A metal protective coating composition in accordance with claim 1 in which the compound is benzoic acid.

6. A metal protective coating composition in accordance with claim 1 in which the compound is phenyl benzoic acid.

7. A resin consisting essentially of the reaction product of about one to six parts by weight of sorbitan mono fatty acid ester per one part by weight of an ester of stearic acid and an alcohol having from one to six carbon atoms and per one part by weight of a compound selected from the group consisting of benzoic acid and a substituted derivative of benzoic acid in which at least one substitution of one of the hydrogen atoms in the benzene nucleus of the benzoic acid with the group selected from $NH_2$, $NO_2$, F, Cl, Br, I, and the following organic radicals: methoxy, ethyl, ethoxy, benzyl, toluic, and phenyl is made.

8. A method for forming resin which comprises heating at a temperature of at least 300° F. a mixture of about one to six parts by weight of a sorbitan mono fatty acid ester with one part by weight of an ester of stearic acid and alcohol having from one to six carbon atoms and one part by weight of a compound selected from the group consisting of benzoic acid and a substituted derivative of benzoic acid in which at least one substitution is made for one of the hydrogen atoms in the benzene nucleus of the benzoic acid with the group selected from $NH_2$, $NO_2$, F, Cl, Br, I, and the following organic radicals: methoxy, ethyl, ethoxy, benzyl, toluic, and phenyl in the presence of substantially pure zinc.

9. A method in accordance with claim 8 in which a compatible corrosion inhibitor is intimately dispersed throughout the mixture during its resinification.

10. A method in accordance with claim 9 in which the compatible corrosion inhibitor is a polar organic compound corrosion inhibitor.

11. A method in accordance with claim 10 in which the polar organic compound corrosion inhibitor is a tertiary amine oxide.

12. A method in accordance with claim 8 in which the compound is benzoic acid.

13. A method in accordance with claim 8 in which the compound is phenyl benzoic acid.

References Cited in the file of this patent
UNITED STATES PATENTS
2,558,025    Wicks ------------------ June 26, 1951